UNITED STATES PATENT OFFICE.

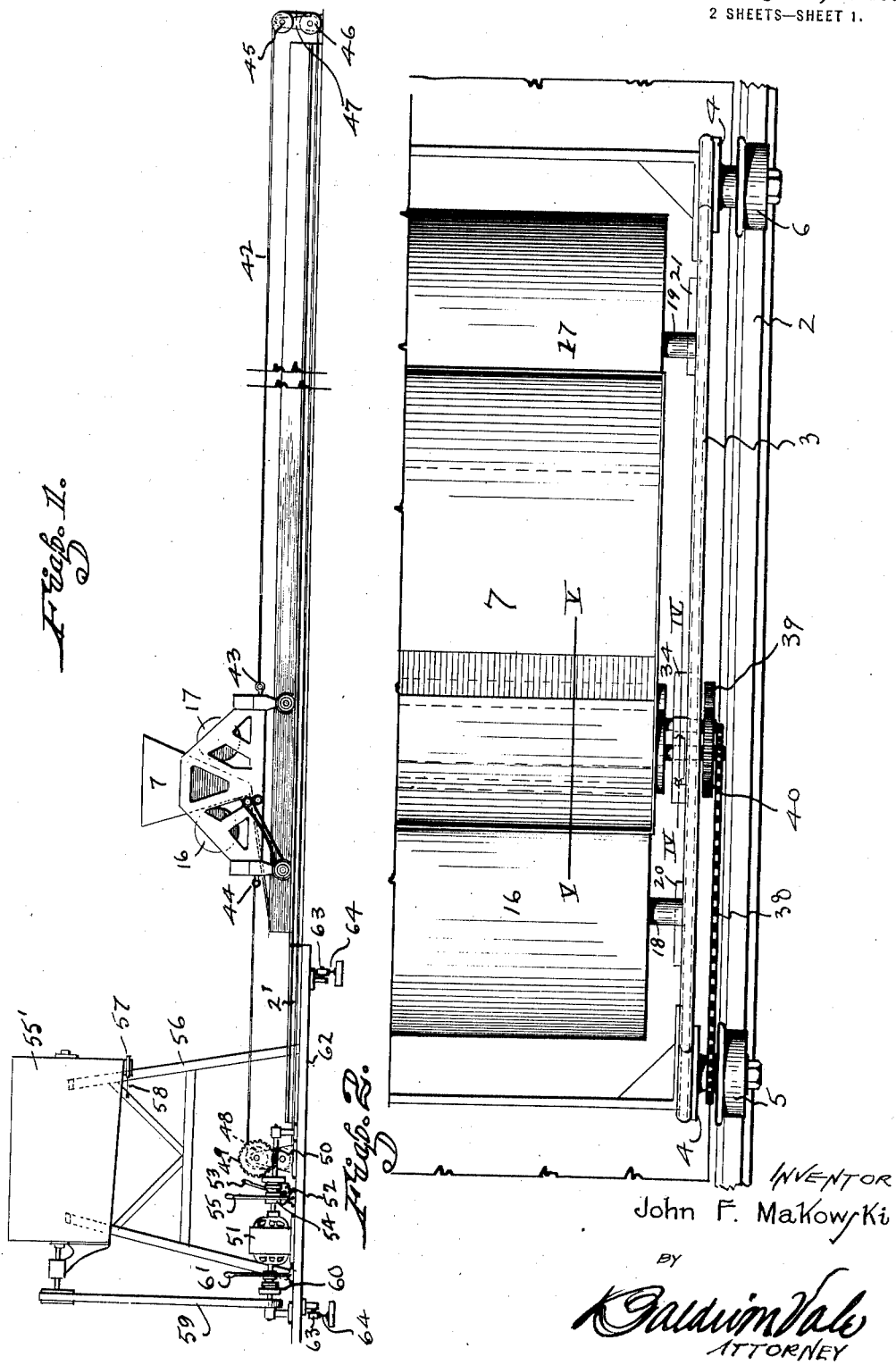

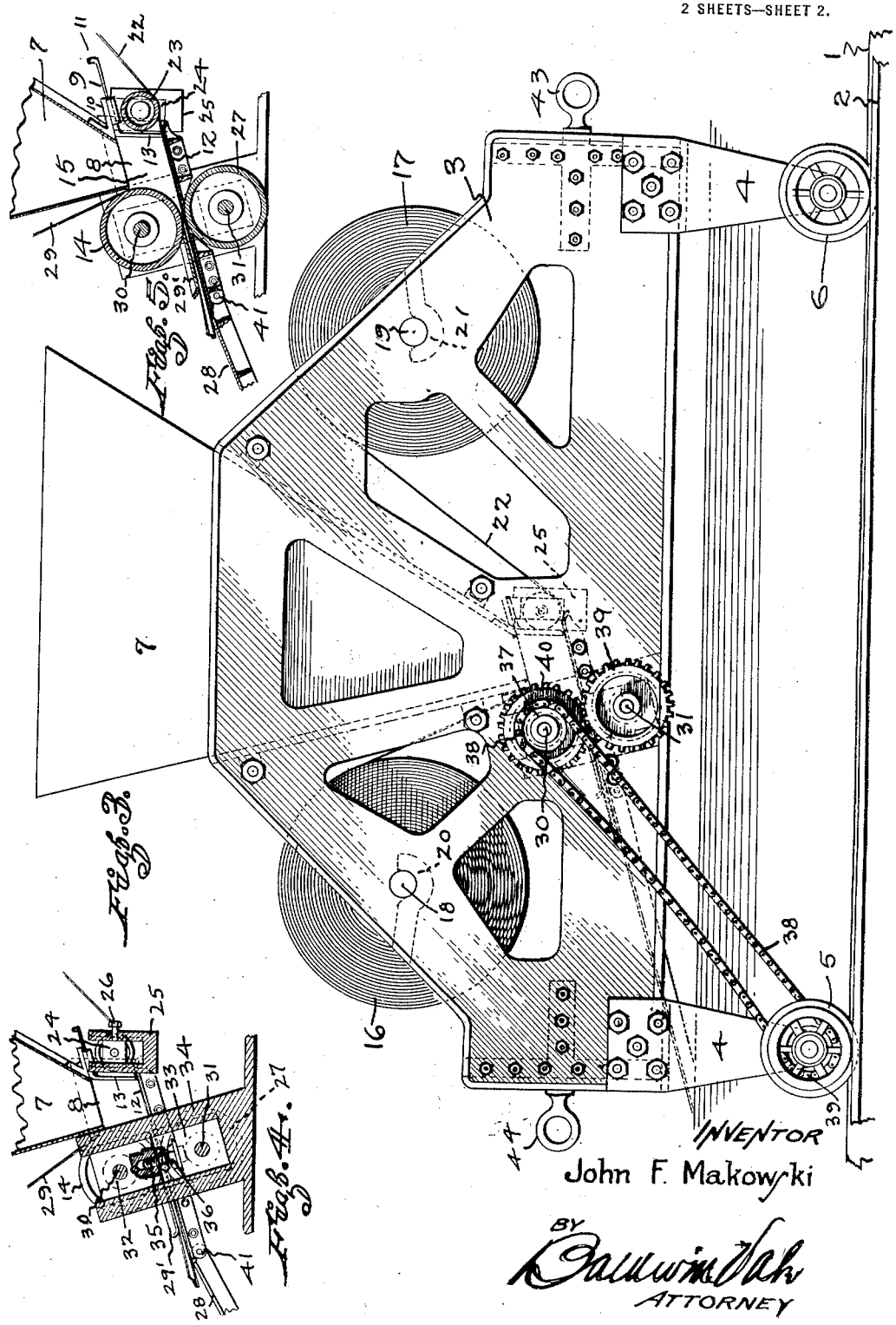

JOHN F. MAKOWSKI, OF SAN FRANCISCO, CALIFORNIA, ASSIGNOR OF ONE-HALF TO JAMES A. LEVENSALER, OF SAN FRANCISCO, CALIFORNIA.

MACHINE FOR FABRICATING PLASTER-BOARD.

1,349,777.  Specification of Letters Patent.  Patented Aug. 17, 1920.

Application filed February 6, 1918. Serial No. 215,627.

*To all whom it may concern:*

Be it known that I, JOHN F. MAKOWSKI, a citizen of the United States, and a resident of the city and county of San Francisco, State of California, have made a new and useful Invention—to wit, Machines for Fabricating Plaster-Board; and I do hereby declare the following to be a full, clear, concise, and exact description of the same.

The invention relates particularly to the manufacture of plaster board for use in the walls of buildings, either as a finish or as a substitute for laths, and the like, for receiving a plaster finish.

Among the objects of this invention are to provide a machine and a method for manufacturing this product, in the practice of which the moist and unstable board is laid upon a fixed surface and permitted to set without agitation or disturbance, liable to interfere with the natural and proper crystallization of the plaster element, and to provide means whereby succeeding layers may be superimposed upon each other without movement of the layers, formed or being formed, until the product has set or hardened. Other objects and advantages will appear as this description progresses.

In this specification and the annexed drawings, the invention is illustrated in the form considered to be the best, but it is to be understood that the invention is not limited to such form because it may be embodied in other forms, and it is also to be understood that in and by the claims following the description it is desired to cover the invention in whatever form it may be embodied.

The article of manufacture known as plaster board comprises a continuous sheet of paper having a thin layer or core of plaster thereon with an overlayer of paper on top of this plaster core. The plaster generally used for the purpose consists of quick setting plastic mixtures including gypsum products, plaster of Paris, what is known as hard wall plaster, and the like. It is economically necessary that this product set quickly, that is within four or five minutes after fabrication. It is an established fact that agitation and disturbance, such as transporting the wet plaster board on drapers or conveyers, has a decidedly deleterious effect upon the crystallization or setting of the plaster core, progressing at the rapid rate described. To improve the product by obviating these disadvantages in its production, also to reduce the amount of labor in producing and subsequently handling this product are among the objects of this invention.

In the accompanying two sheets of drawings:

Figure 1 is a diagrammatic side elevation of a machine constructed in accordance with this invention.

Fig. 2 is an enlarged fragmentary detail in plan looking down upon the assembling carriage.

Fig. 3 is a side elevation of the same.

Fig. 4 is a fragmentary detail partly in cross section of the plaster containing hopper, the adjustable gage rolls and the inclined adjustable chute for the assembled plaster board.

Fig. 5 is a similar view of the same taken on the line V—V Fig. 2.

In detail the construction illustrated in the drawings includes a suitable foundation for the table surface or base 1, which may be of indefinite length according to the factory space available, and is preferably composed of cement true to plane and properly surfaced as in the practice of forming cement floor or sidewalks. The true plane of the table 1 is best accomplished by laying the steel rails 2—2 on the foundation and properly alining them level, they then form a level gage useful in bringing the cement table 1 to a true plane with the rails. The assembling carriage comprises the side frames 3—3 suitably cross braced and tied, to form a main frame, having the wheel standards 4—4 fixed thereto, by means of which the carriage is supported on the traction wheels 5 and 6, resting upon the rails 2 and provided with suitable flanges to prevent derailment. The carriage is provided with the hopper 7, adapted to contain a charge of mixed plaster and terminating at the bottom in the discharge opening 8, closed by the gate 9, suitably guided at 10 to be slid across the opening 8 to arrest the flow of plaster from the hopper. The handle 11 or other means being provided for manipulating the gate 9. The plaster discharges onto the floor plate 12 which combined with an apron 13 on the gate 9 and the gage roll 14 forms a box like space 15 from which the plaster is cast.

The assembling carriage is provided with two reels of continuous paper 16 and 17, the width of which determines the width of the finished plaster board. These reels are supported upon the cross shafts 18 and 19 resting in suitable bearings 20 and 21, formed on the side plates 3—3), in such a manner that the reels may be easily mounted or dismounted from the frame. The sheet of paper 22 on the reel 17 is reeved under the idle roller 23 journaled in the bearing block 24, that is adjustable vertically in U-shaped guides 25 formed on the plates 3—3 and fixed in the desired position by the set screw 26. This construction is duplicated at opposite ends of the roller 23. Underneath the roller 23 the end of the paper is passed beneath the apron 13 and bears against the plate 12 and passed forward over the lower gage roller 27 and out onto the chute 28. The sheet of paper 29 from the reel 16 passes behind the gage roller 14, around and under the same approximate to the sheet 22; both sheets passing between the gage rollers 14 and 27 and outward therefrom between the head of the chute 28 and the draw plate 29'. The plaster contained within the box 15 flows outward with and between the sheets of paper 22 and 29 to complete the plastic assembly of the plaster board. The shafts 30 and 31 of the gage rolls respectively are journaled in the bearing blocks 32 and 33, guided in U-shaped guides 34 formed in the side plates 3—3 on opposite sides of the machine. The block 33 is fixed within the guide and is joined to the block 32 by the spindle 35 threaded therein and swiveled in the blocks 33, whereby rotation of the spindle varies the distance between the gage rolls 14 and 27, the desired adjustment being by the lock nut 36 on the spindle, whereby the gage of the finished plaster board may be determined to a fixed thickness, with a wide range of adjustability.

The shaft 30 extends through the plate 3 and has the sprocket 37 fixed thereon, to receive the sprocket chain 38 engaging a similar sprocket 39 on the traction wheel 5, whereby the rotation of the traction wheel during the progress of the carriage is transmitted in unison to the gage wheel 27, causing a peripheral travel thereof equal to the lineal travel of the carriage, whereby the assembled plaster board remains stationary while the gage rolls and chute move forward and the board is laid on the table 1 without push or draw, liable to stretch or compress it; the limp plaster board remaining stationary while the chute withdraws from beneath it. The rotation of the gage wheel 27 is transmitted through the gear 39 thereon and enmeshed with the gear 40 fixed on the shaft 30; these gears 39 and 40 being of the form and arranged like the gears between the rolls of a clothes wringer, whereby the rolls may be adjusted without seriously interfering with the proper meshing of the gears. Gear wheels are used at this point in preference to chain and sprocket, as it is important the rolls 14 and 27 should move in perfect unison. The advance of the sheets 22 and 29 carry forward a quantity of plaster in accordance with the separation of the gage rolls 14 and 27, the draw plate 29' preventing the buckling of the assembled board as it leaves the rolls, laying it smoothly upon the chute. The chute 28 is hinged at 41 to permit adjustment of the angle of declivity of the chute to the surface of the table 1 or the top layer of plaster board supported thereon. The assembled plaster board trails out behind the advancing assembling carriage from the chute 28 as the carriage moves forward.

The assembling carriage may be auto propelled by mounting the propelling force thereon, or as preferred it may be moved backward or forward by means of an endless cable 42, having its opposite ends fixed in the bits 43 and 44 on the carriage. The loop of the cable passes over the rollers 45 and 46 mounted upon a movable truck 47. The bight of the cable passes around a winding drum 48 having a worm gear 49 fixed thereon and enmeshed with the worm 50 geared to the motor 51 through an intermediate reverse gear mechanism 52, controlled by the handle 53. For stopping and starting the carriage in the direction controlled by the reverse gear handle 53, the clutch 54 is interposed in the shaft and operated by the handle 55, for controlling the application of the power from the motor 51 to the worm 50, whereby the assembly carriage may be moved in either direction at the will of the operator. The speed of the assembling carriage is only limited by the speed that the moist board will stand in fabrication. A consistent speed for the movement of the carriage is about 100 feet every seven minutes, more or less, which is consistent with the setting time of the average plastic composition, that is to say, a sheet of plaster board will set sufficiently in seven minutes to sustain the weight of a superimposed layer cast thereon, in about 7 minutes after the time of casting the first sheet, if it is desired to operate in this manner. The mixer 55', which may be of any desired type, is mounted on the superstructure 56, mounted upon the same base as the motive power and so situated that the mouth of the hopper 7 will pass beneath the outlet 57 of the mixer, whereby the hopper may be charged by opening the outlet by means of the gate control lever 58.

By this arrangement the mixer can be preparing a batch of plaster while the carriage is making a trip forward and back. The agitator within the mixer 55' is driven by the belt 59 engaging a pulley on the shaft of the motor 51, through the interposed clutch 60 controlled by the handle 61.

Where there is ample factory space and it is desired to cast each sheet of plaster board singly, a number of parallel tables, such as 1, provided with a set of tracks 2 may be provided. For thus operating, I mount the motive mechanism on a truck such as 62 having rollers 63 resting upon transverse tracks 64—64 and carrying a section of track 2' equal to the wheel base of the assembly carriage, whereby the carriage may be drawn thereonto and both mechanisms advanced transversely, including the cable loop truck 47 to alinement with a parallel table 1, whereupon another assembled sheet of plaster board may be cast as previously described and the operation repeated *seriatim* throughout a series of tables and returned to the first table when the first sheet cast is sufficiently set to receive a superimposed board to be cast thereon, or cut to standard lengths by suitable machinery or by hand saws and removed from the table.

By the process of this invention as described, a superior product results as previously stated, owing to the method of casting or assembling the sheets of plaster board, also to the fact that it is undisturbed after its assembly, which is a cardinal virtue in this process. There is a further economic advantage due to the practical elmination of waste as the permanent casting of the sheet results in a perfect, commercial, lateral edge, which has not been so far accomplished by any machine using a draper or conveyer to handle the newly cast sheets; the latter process requiring edge trimming to commercial sizes to accomplish a commercially perfect lateral edge. There is a further advantage and saving in casting a sheet of indefinite length on a fixed table as there is no necessity for transverse severing of the sheet while wet or plastic to make it possible to handle the same in stock, with the further waste necessarily incidental to retrimming the ends which have been severed in the plastic state, as it has been found impracticable to so sever the boards while they are moist or plastic without subsequent waste.

In contemplating this invention, it is well to bear in mind that an improved product results where the permeability of the paper sheets 22 and 29 is not seriously impaired, the result being a better adhesion between the plaster core and the inclosing paper sheets, it being important that these do not separate easily in the finished product; it is also desirable to preserve the permeability of the paper in order to make the finished plaster coat, subsequently applied thereto, likewise adhere permanently. The pulpy nature and friability of the paper, such as used for this purpose is well known. It is also obvious that the paper becomes saturated almost immediately upon contact with the fluid plaster applied thereto in casting the plaster board, rendering it expedient to at once dispose of the assembled plaster board from the carriage to a permanent and quiet base such as the table 1. In this manner more fluid and consequently better flowing and finer textured plaster can be used in combination with paper of the desired high permeability; the combined result being a plaster board as nearly perfect as may be, within the limitations of present practice and anticipated development.

Having thus described this invention, what I claim and desire to secure by Letters Patent is:

1. A plaster board machine including a stationary bed; a carriage adapted to travel over said bed; a plaster hopper on said carriage having an outlet and means for feeding sheets of paper on opposite sides of said hopper, and depositing said sheets on said bed as said carriage moves thereover.

2. A plaster board machine including a stationary bed; a carriage adapted to travel over said bed; a plaster container and a thickness gaging mechanism on said carriage; means for feeding a sheet of paper beneath the outlet from said hopper and spreading a layer of plaster thereon; means for superimposing a layer of paper on said plaster and passing said assembly through said thickness gaging mechanism; and means for depositing said assembly on said bed without pushing or drawing strains.

3. A plaster board machine including a stationary bed; a carriage adapted to travel over said bed; a hopper; a chute; interspaced gage rolls; and means for supporting paper reels in said carriage; means for feeding paper from said reels on opposite sides of the outlet from said hopper, through said gage rolls to said surface over said chute and means for driving said rolls in unison with the travel of said carriage.

4. A plaster board machine including a stationary bed; a carriage adapted to travel over the said bed; a hopper; a pivoted chute extending from beneath said hopper to said bed; interspaced gage rolls geared together adjacent to the outlet from said hopper and driving means between said gage rolls and the tractive support of said carriage; means for supporting paper reels on said carriage; means for feeding paper from said reels on opposite sides of the outlet from said hopper, between said gage rolls to said bed over said chute.

5. A plaster board machine including a stationary bed; a carriage adapted to travel over said bed; a hopper; a pivoted chute extending from beneath said hopper to said bed; interspaced gage rolls geared together adjacent to the outlet from said hopper and driving means between said gage rolls and the tractive support of said carriage; means for supporting paper reels on said carriage; means for feeding paper from said reels on opposite sides of the outlet from said hopper, between said gage rolls to said bed over said chute; and a motive mechanism attached to said carriage.

6. A plaster board machine including a stationary bed; a carriage adapted to travel over said bed; means on said carriage for assembling plaster board and laying it on said bed; a truck adapted to travel transversely to said bed and adapted to accommodate and support said carriage; a motive mechanism on the truck and attached to said carriage, and a mixer adapted to be discharged into the hopper of said plaster board assembling mechanism on said carriage.

7. A plaster board machine including a series of stationary beds; a carriage adapted to travel over said beds; means on said carriage for assembling plaster board and laying it on said beds, a motive mechanism attached to said carriage; and means for moving said carriage and motive mechanism transversely into alinement with each of said beds in the series.

8. A plaster board machine including a series of stationary beds; a carriage adapted to travel over said beds; means on said carriage for assembling plaster board and laying it on said beds; a truck adapted to travel transversely to said beds and adapted to support said carriage; and a motive power on said truck attached to said carriage.

9. A plaster board machine including a series of stationary beds; a carriage adapted to travel over said beds; means on said carriage for assembling plaster board and laying it on said beds; a truck adapted to travel transversely to said beds and adapted to accommodate and support said carriage when the latter is moved to the end of said beds, and a motive power on said truck having connection with the carriage to move it longitudinally over said beds and having connection with the truck to move it transversely to said beds.

In testimony whereof, I have hereunto set my hand at San Francisco, California, this 26th day of December, 1917.

JOHN F. MAKOWSKI.

In presence of—
BALDWIN VALE,
LINCOLN V. JOHNSON.